Figure 1:
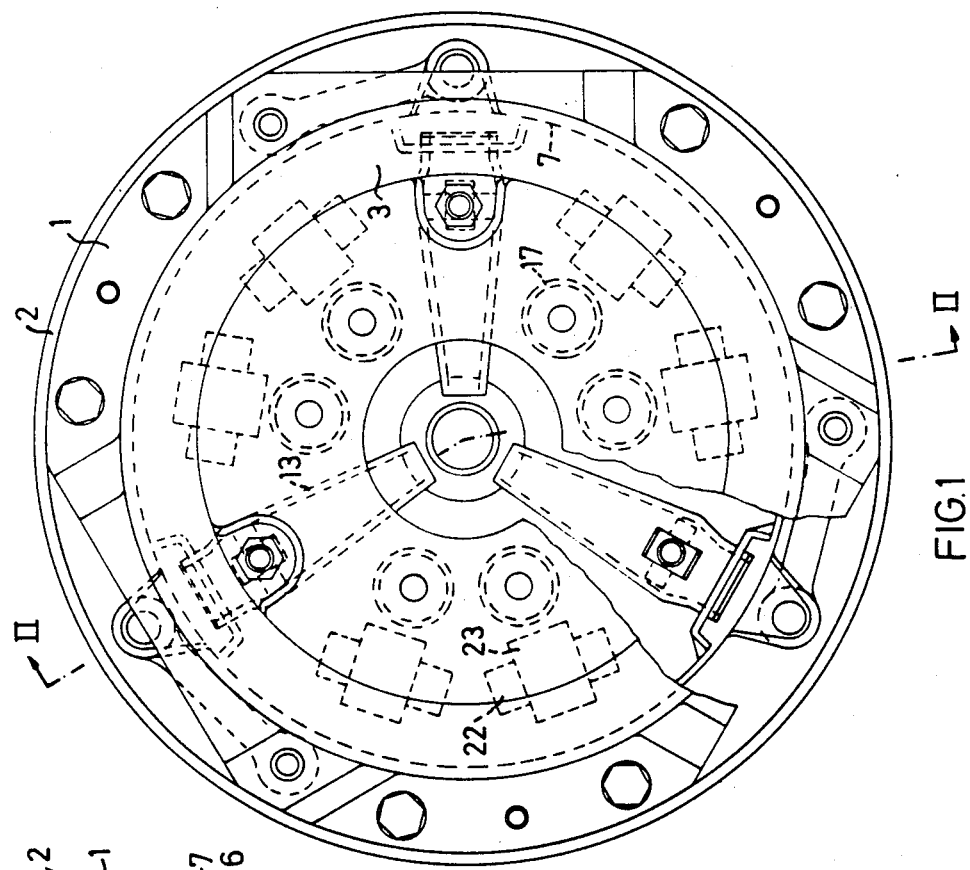

United States Patent [19]

Rådbo et al.

[11] Patent Number: 4,485,905
[45] Date of Patent: Dec. 4, 1984

[54] CENTRIFUGAL FRICTION CLUTCH FOR MOTOR VEHICLES WITH THREE POSITION OF OPERATION

[75] Inventors: Berndt E. Rådbo, Västra Frölunda; Grzegorz K. Janiszewski, Angered, both of Sweden

[73] Assignee: Ab Volvo, Gothenburg, Sweden

[21] Appl. No.: 384,663

[22] Filed: Jun. 3, 1982

[30] Foreign Application Priority Data

Jun. 4, 1981 [SE] Sweden ................................ 8103523

[51] Int. Cl.³ ............................................. F16D 43/06
[52] U.S. Cl. .............................. 192/103 A; 192/105 B; 192/83
[58] Field of Search ................. 192/105 B, 103 A, 83, 192/70.27, 70.28, 70.29, 89 W

[56] References Cited

U.S. PATENT DOCUMENTS

| | | | |
|---|---|---|---|
| 2,196,475 | 4/1940 | Reed | 192/70.27 X |
| 2,368,299 | 1/1945 | Hayter | 192/70.27 X |
| 2,642,055 | 6/1953 | Dalrymple | 192/103 A X |
| 2,902,129 | 9/1959 | Reed | 192/105 B |
| 2,976,975 | 3/1961 | Thostenson et al. | 192/70.28 X |
| 3,006,449 | 10/1961 | Binder | 192/105 B |
| 3,035,460 | 5/1962 | Guichard | 192/105 B |

FOREIGN PATENT DOCUMENTS

| | | |
|---|---|---|
| 1087460 | 8/1960 | Fed. Rep. of Germany ... 192/105 B |
| 1016348 | 11/1952 | France . |
| 1316983 | 12/1962 | France . |
| 0555686 | 9/1943 | United Kingdom . |
| 1561857 | 3/1980 | United Kingdom . |

Primary Examiner—Rodney H. Bonck
Assistant Examiner—David D. House
Attorney, Agent, or Firm—Young & Thompson

[57] ABSTRACT

A manually disengageable centrifugal clutch for motor vehicles has a clutch cover fixed to a flywheel, a pressure plate axially movable relative to the flywheel, and an intermediate disc. An intermediate plate defines, together with the pressure plate, a plurality of outwardly narrowing spaces for radially movable centrifugal weights and is spring biased towards the pressure plate. The intermediate plate is suspended on disengagement arms and is movable thereby away from the pressure plate. In one position at a certain distance from the pressure plate, the spaces for the centrifugal weights are widened so much that the weights cannot exert any pressure on the pressure plate. The clutch is thereby disengaged regardless of rotational speed, the disengaging force only depending on the spring force on the intermediate plate.

4 Claims, 5 Drawing Figures

CENTRIFUGAL FRICTION CLUTCH FOR MOTOR VEHICLES WITH THREE POSITION OF OPERATION

The present invention relates to a friction clutch, especially for motor vehicles, comprising a driven clutch element in the form of at least one disc with friction lining, which can be pressed against a frictional surface on a driving clutch element, e.g. a flywheel, by means of a pressure plate which is non-rotatably but axially displaceably joined to the driving clutch element, a clutch cover rigidly joined to the driving element, centrifugal weights disposed between the clutch cover and the pressure plate and interacting with the pressure plate to vary its pressing force against the disc in response to the rotational speed, and a disengaging mechanism acting between the clutch cover and the pressure plate, which when actuated permits axial displacement of the pressure plate in the direction away from the disc.

Centrifugal clutches of this type are used together with manually shifted transmissions and automatic transmissions, for example those constructed according to the same principles as a conventional manual transmission, but in which the shifting is done electromagnetically instead. In a common centrifugal clutch of the type described above, the centrifugal weights are carried by levers pivotally mounted in the clutch cover and spring biased towards a retracted position. As the engine speed increases, these levers are swung out and move the pressure plate closer and closer to the disc, and press the disc tightly against the flywheel when operational speed has been achieved. For shifting, a disengagement bearing is pressed against the clutch levers, pulling the pressure plate away from the clutch disc.

A centrifugal clutch with this design and function has a number of significant disadvantages. It provides full clutch force only after reaching a rotational speed approaching 1500 r.p.m., which makes it impossible to use low engine speed, which provides the best fuel economy. At higher engine speeds, very large disengaging forces are required, since the disengagement is effected against the engaging force of the centrifugal weights. Finally, a special blocking mechanism is required to make it possible to push-start the engine.

The purpose of the present invention is to achieve a friction clutch of the type described in the introduction, which eliminates the disadvantages of previously known designs and also has additional advantages thereover.

This is achieved according to the invention by virtue of the fact that the centrifugal weights are in the form of radially displaceable elements disposed in radially outwardly narrowing spaces, which have axially displaceable wall elements facing towards the pressure plate, which are spring biased towards the pressure plate and which are displaceable in the opposite direction by means of the disengaging mechanism.

The construction according to the invention provides disengagement at high engine speed, by widening the spaces for the centrifugal weights, so that the narrowest portion of said spaces is wider than the weights, thus removing the engaging force from the weights. The disengagement is effected by displacing the spring biased wall elements away from the pressure plate, which means that the engagement force only need exceed the spring force and is thus entirely independent of the engine speed. Engagement with constant spring force regardless of the engine speed can be achieved in the converse manner by allowing the wall elements to move so far in the opposite direction that the widest portion of the spaces is equal in width to the weights, or so that stops rigidly joined to the wall elements are in direct contact with the pressure plate. This provides full engaging force when operating at low engine speed and eliminates the need for special blocking means to make it possible to push-start the engine.

When the wall elements are placed in a position between said outer positions, engagement is achieved by the effect of the centrifugal weights, as they are gradually pressed outwards with increasing r.p.m. in the narrowing spaces.

Figure 2:
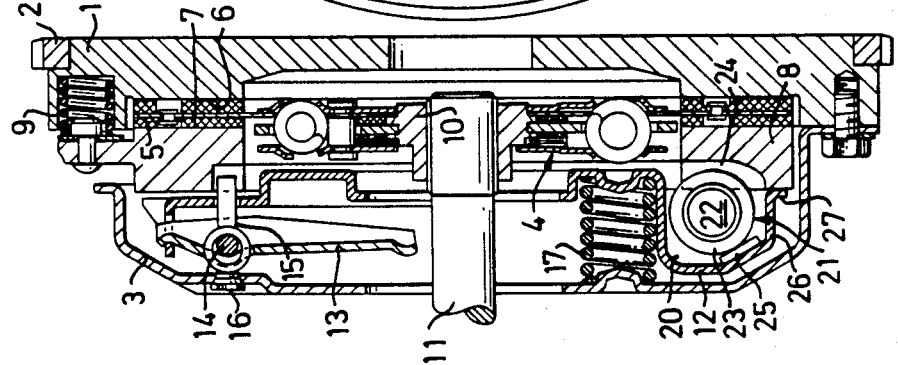
Figure 3:
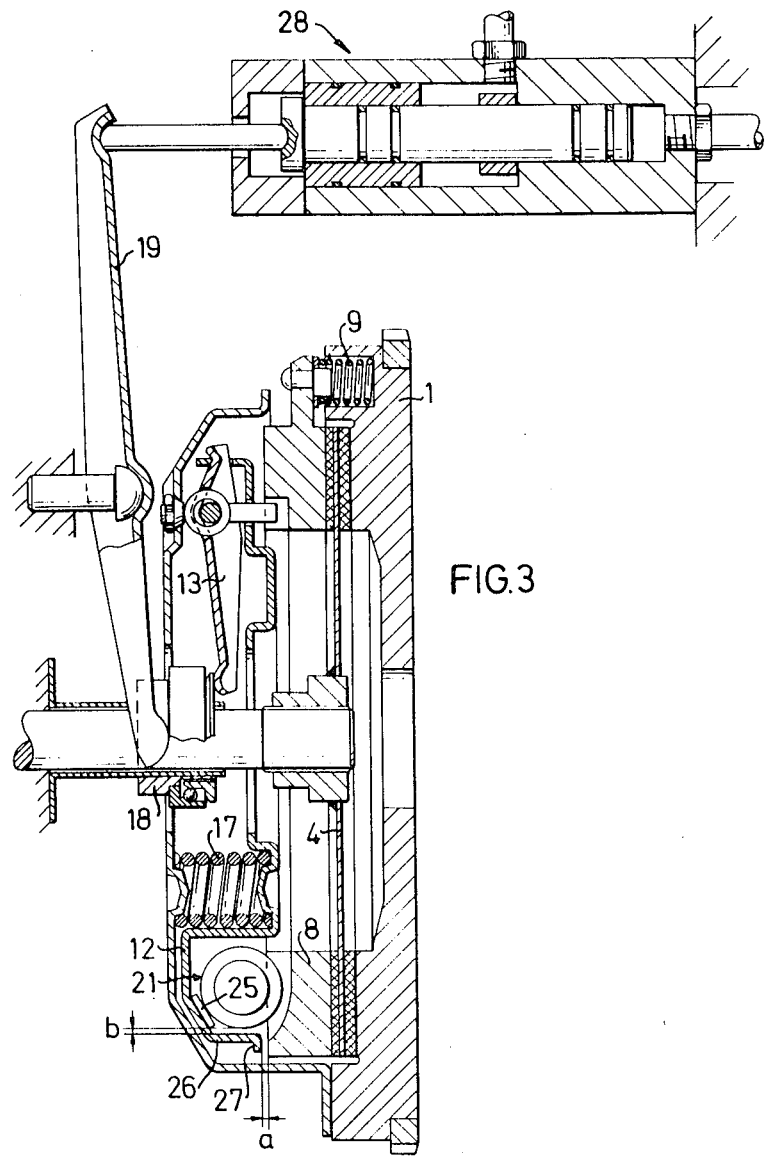
Figure 4:
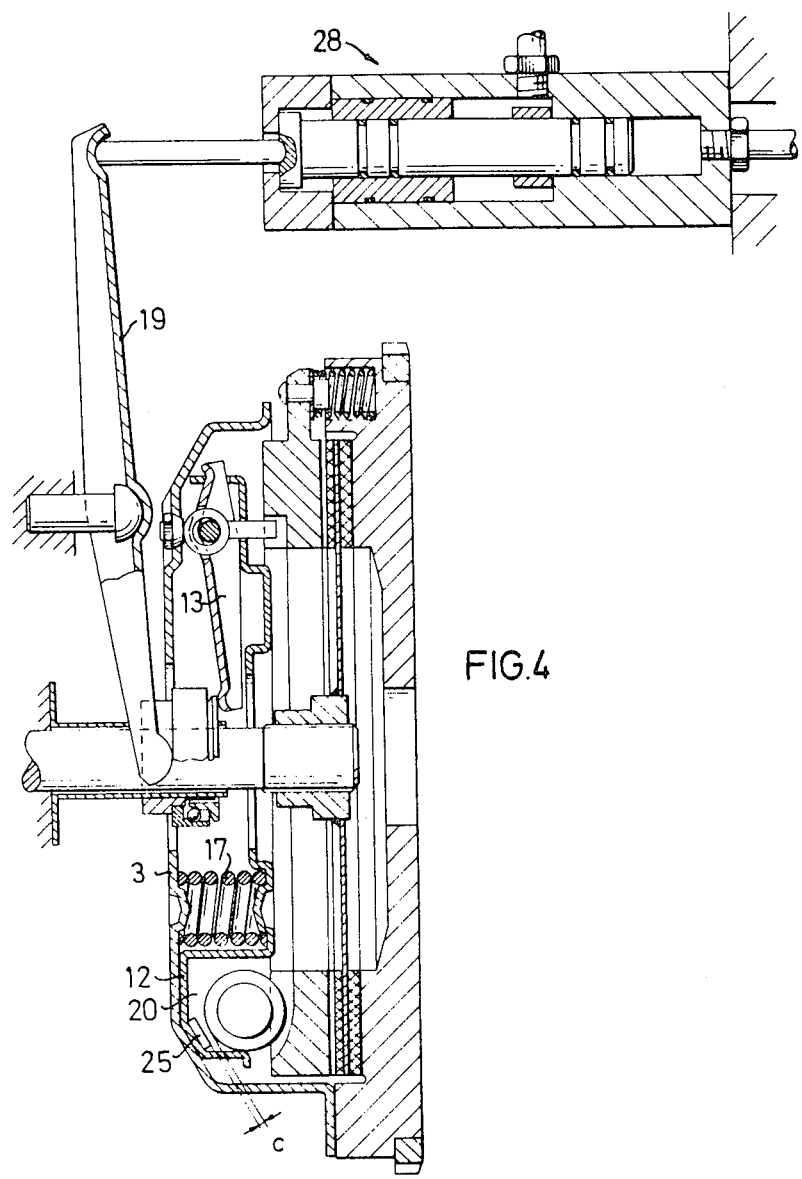
Figure 5:
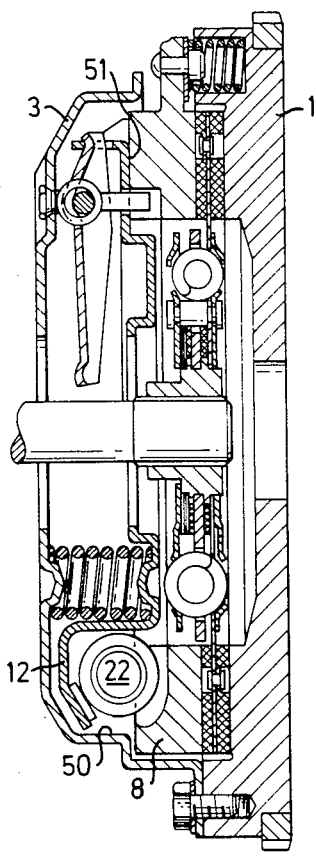

The invention will be described in more detail below with reference to the examples shown in the accompanying drawings, of which FIG. 1 is an end view of a clutch according to the invention, FIG. 2 is a longitudinal section along the line II—II in FIG. 1 illustrating the disengaging mechanism in a first position, FIG. 3 is a longitudinal section corresponding to FIG. 2 showing the disengaging mechanism in a second position, FIG. 4 is a longitudinal section corresponding to FIG. 3 illustrating the disengaging mechanism in a third position, and FIG. 5 is a longitudinal section corresponding to FIG. 2 illustrating a slightly modified clutch according to the invention.

In the figures, 1 designates an engine flywheel having a starting rim 2. A clutch cover 3 is screwed securely to the flywheel. A conventional disc 4 with a friction lining 5 lies between a frictional surface 6 on the flywheel 1 and a frictional surface 7 on a pressure plate 8, which is non-rotatably but axially displaceably joined to the flywheel 1. The pressure plate 8 is biased away from the flywheel by springs 9. The disc 4 has a hub 10 which is joined via splines to the input shaft 11 to a gearbox.

Between the clutch cover 3 and the pressure plate 8 there is a plate 12 suspended on three clutch arms 13, which are in turn pivotally joined in a known manner to the clutch cover 3, the pivot shafts 14 of the arms 13 being fixed on adjustment screws 15 with nuts 16. Compression springs 17 are mounted between the clutch cover 3 and the plate 12 and urge the latter towards the pressur plate 8. Displacement of the plate 12 towards the clutch cover 3 against the force of the springs 17 is achieved by pivoting the clutch arms 13 counter-clockwise (as seen in FIGS. 2–4), which is effected by axial displacement of a conventional sleeve-mounted disengagement bearing 18 (FIGS. 3 and 4) which interacts with a clutch fork 19.

In the spaces between the pressure plate 8 and the plate 12 there are centrifugal weights 21 which are movable radially. The weights 21 consist of a first metal cylinder 22 and a second metal cylinder 23 which is shorter than the first cylinder and is rotatably mounted on needle bearings on the same. The cylinder 23 lies in a groove 24 in the pressure plate, the cylinder 22 providing shaft ends for the cylinder 23 and resting on the edges of the groove 24. The depth of the groove is here greater than the difference between the radii of the cylinders, so that the outer cylinder can rotate freely, and when it moves in the spaces 20 it can roll against the wall element 25 on the plate 12. The plate 12 has outer defining walls 26 which end in a stop surface 27.

By means of an operating cylinder 28, shown in FIGS. 3 and 4, the clutch fork 19 can be controlled so that the clutch can be set in three different operating states. In a first state, shown in FIG. 2, the clutch arms 13 are not affected by the disengagement bearing (not shown), with the result that the springs 17 press, via the plate 12 with its stop 27, the pressure plate 8 against the disc. In this position, the clutch functions as a conventional single-disc dry disc clutch with constant pressure on the pressure plate.

FIG. 3 shows the clutch in a position in which the clutch arms 13 are pivoted slightly counter-clockwise from the position in FIG. 2. In the position now assumed by the plate 12, the distance between the wall elements 25 and the pressure plate 8 is such that the springs 9 between the flywheel and the pressure plate can press the latter out of engagement with the disc at idling speeds, when the centrifugal weights 21 are in their radially inner position. When the r.p.m. increases, the centrifugal weights 21 are gradually pressed outwards and, through interaction with the wall elements 25, press the pressure plate 8 against the disc. When operating speed and full engagement has been achieved, the maximum force on the pressure plate is determined by the springs 17. In this case there should be a gap between on the one hand the weights 21 and the wall 26 and on the other hand the stop 27 and the pressur plate 8, as indicated by a and b in FIG. 3, before full engagement is achieved. Thus in FIG. 3, the clutch functions as a centrifugal clutch.

In FIG. 4, the disengagement arms are pivoted slightly further counter-clockwise from the position in FIG. 3. In this position, the plate 12 abuts against the clutch cover 3, the smallest width of the spaces 20 being greater than the active width of the weights, i.e. there is a play c between the weights 21 and the wall elements 25 when the weights are in their radially outermost position. Here, the clutch functions as a conventional disengaged disc clutch, the disengaging force being independent of the springs 17.

In FIG. 5, the clutch is shown in a somewhat modified embodiment and in the same operational state as in FIG. 2. Here the plate 12 has no counterpart to the wall 26 in the embodiment described above. Instead, the clutch cover 3 is bent radially inwards so that its wall portion 50 serves as a limiting abutment for the centrifugal weights in their radially outer position, i.e. the position corresponding to FIG. 4. In the position shown in FIG. 5, the outer portions 51 between the weights abut directly against the pressure plate 8. The outer portions 51 thus have the same function as the stop surface 27 in the preceding embodiment. Alternatively, the pressing force from the plate 12 to the pressure plate 8 can be transmitted via the weights 22 in a radially innermost position to obtain the operational state in FIG. 2. The advantage of the embodiment shown in FIG. 5 over the embodiment in FIGS. 1-4 is that the clutch is easier to balance when the clutch cover is used as an outer limiting abutment, since the cover 3 is fixed to the flywheel 1 and is not spring-suspended as is the plate 12.

What we claim is:

1. A friction clutch, especially for motor vehicles, comprising a driven clutch element in the form of at least one disc with friction lining, which can be pressed against a frictional surface on a driving clutch element by means of a pressure plate which is non-rotationably but axially displaceably joined to the driving clutch element, a clutch cover rigidly joined to the driving element, centrifugal weights disposed between the clutch cover and the pressure plate and interacting with the pressure plate to vary its pressing force against the disc in response to the rotational speed, said centrifugal weights being in the form of radially displaceable elements disposed in radially outwardly narrowing spaces which have wall elements facing toward the pressure plate, said wall elements forming portions of an axially displaceable intermediate plate disposed between the pressure plate and the clutch cover and spring biased toward the pressure plate, a disengaging mechanism acting between the intermediate plate and the clutch cover to displace the intermediate plate between a first position in which the clutch is engaged regardless of the rotational speed and a second position in which the clutch is engaged in response to the rotational speed and a third position in which the clutch is disengaged regardless of the rotational speed.

2. Friction clutch according to claim 1, characterized in that each centrifugal weight consists of two concentrically arranged cylinder elements rotatable relative to each other, of which the inner cylinder element has a greater axial dimension than the outer cylinder element and rests on the edges of a radial groove in the pressure plate, the depth of said groove being greater than the difference between the radii of the cylinder elements, said outer cylinder element being disposed directly in front of said wall element.

3. Friction clutch according to claim 1, characterized in that the intermediate plate has stop surfaces facing the pressure plate and is axially displaceable by means of the disengaging mechanism between the first position in which compression springs, arranged between the clutch cover and the intermediate plate press via said stop surfaces the pressure plate against the disc; the second position in which the compression springs press, via said wall elements and the centrifugal weights, the pressure plate against the disc; and the third position in which the wall elements are displaced so far from the centrifugal weights that the pressure plate can be displaced away from the disc regardless of the rotational speed.

4. Friction clutch according to claim 1, characterized in that the clutch cover forms a limiting abutment which determines the radially outermost position of the centrifugal weights.

* * * * *